J. C. ROSS.
CAR TRUCK.
APPLICATION FILED MAR. 29, 1921.
1,406,287.
Patented Feb. 14, 1922.
2 SHEETS—SHEET 1.
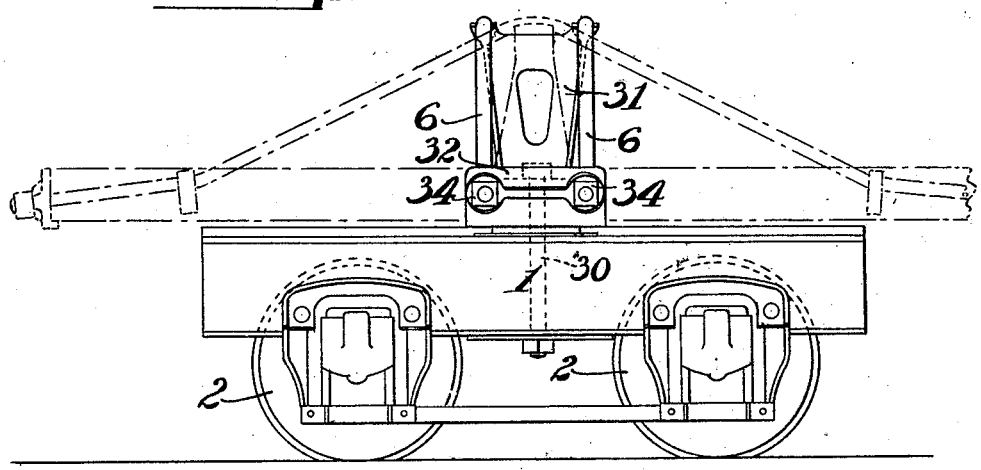
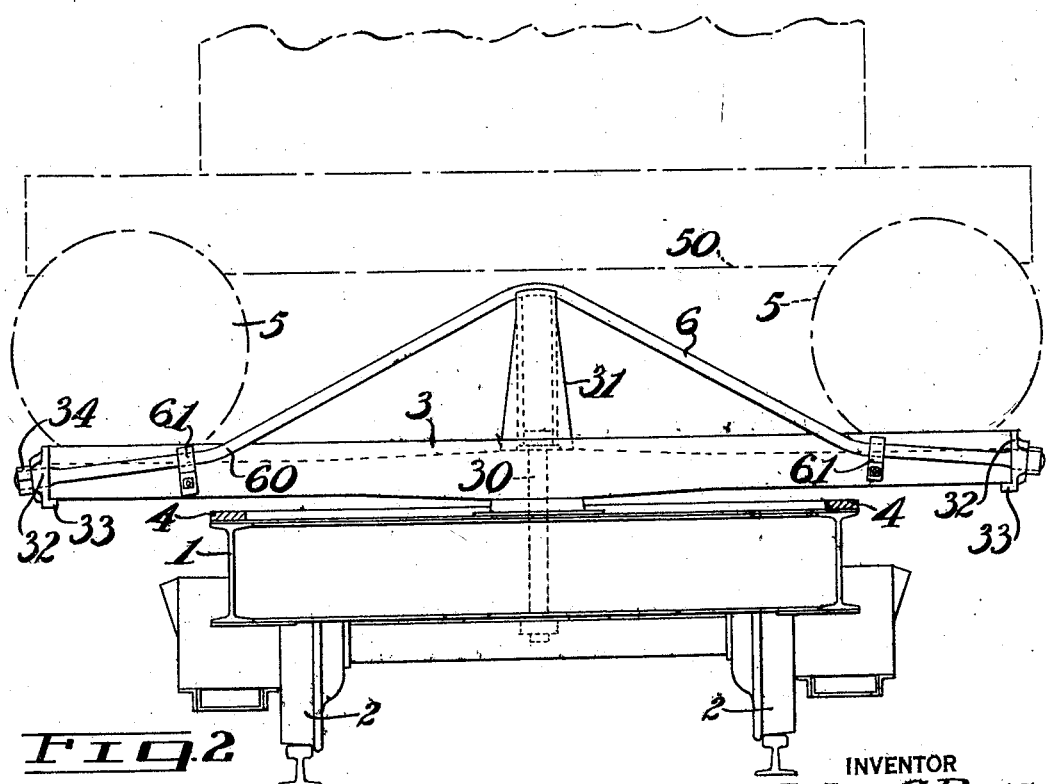
INVENTOR
John C. Ross
BY
H. L. & C. L. Reynolds
ATTORNEYS

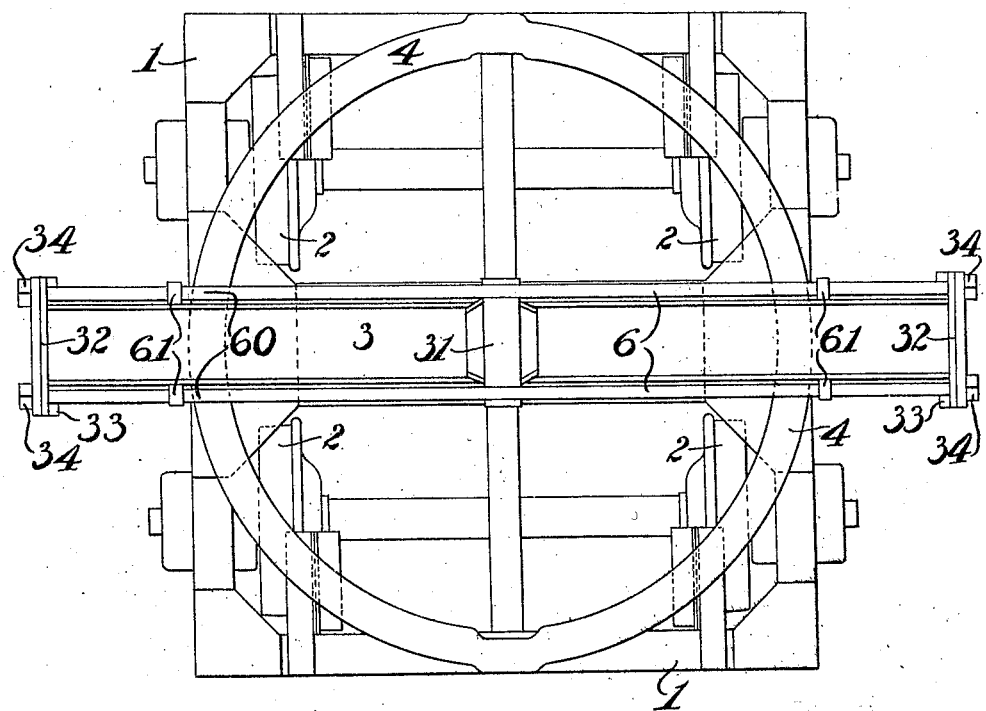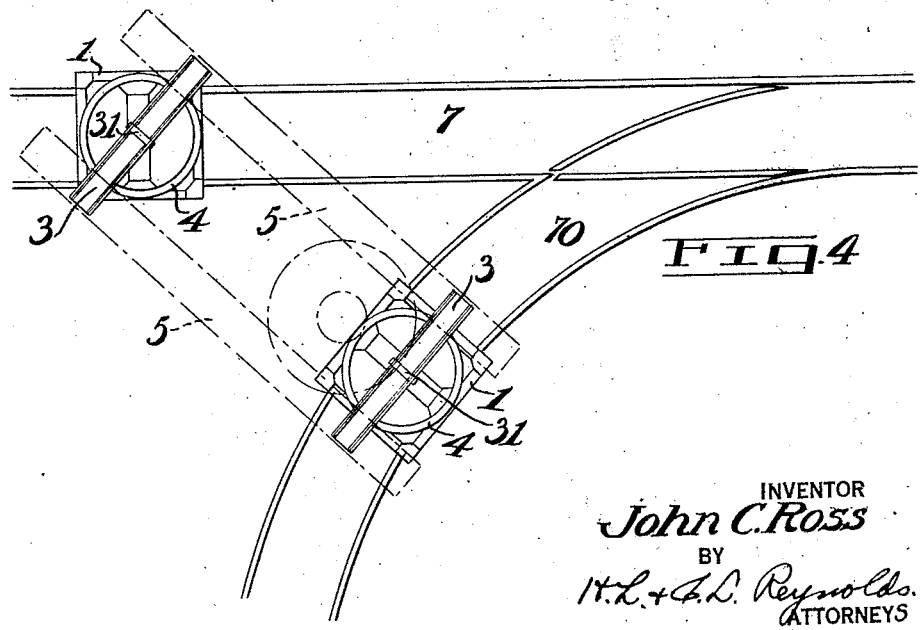

UNITED STATES PATENT OFFICE.

JOHN C. ROSS, OF SEATTLE, WASHINGTON, ASSIGNOR TO PACIFIC CAR & FOUNDRY CO., OF SEATTLE, WASHINGTON, A CORPORATION OF WASHINGTON.

CAR TRUCK.

1,406,287.  Specification of Letters Patent.  Patented Feb. 14, 1922.

Application filed March 29, 1921. Serial No. 456,723.

*To all whom it may concern:*

Be it known that I, JOHN C. ROSS, a citizen of the United States of America, and resident of the city of Seattle, in the county of King and State of Washington, have invented certain new and useful Improvements in Car Trucks, of which the following is a specification.

My invention relates to car trucks and especially to car trucks such as are used for hauling logs and heavy loads in which the load being hauled serves as a connection between two trucks.

The object of my invention is to provide a truck of this character which is especially adapted for use in a particular manner, namely, one which will permit turning of the truck under the load to any angular extent desired, whereby it is possible to obtain certain results which cannot be obtained by the use of trucks of ordinary construction.

In the accompanying drawings I have illustrated a truck constructed in accordance with my invention and in the manner which I now prefer to employ, and I will herein describe the truck as so constructed and will point out the novel features thereof and define the scope of patent protection desired in the claims terminating this specification.

Figure 1 is a side view of a truck constructed in accordance with my invention, the bunk thereof being shown in end view by full lines and in side view by dotted lines.

Figure 2 is an elevation of the truck, the line of view being parallel with the rails upon which the truck is placed, the bunk being shown in side elevation.

Figure 3 is a top or plan view of such a truck and its bunk.

Figure 4 is a diagram showing the manner in which these trucks may be used for accomplishing a special purpose.

The particular purpose for which the truck herein shown has been designed is for carrying such heavy loads as a logging or donkey engine when mounted upon its skid, after the manner in which such engines are commonly employed in heavy logging operations. Such engines are usually mounted upon a skid which is composed of two heavy logs placed parallel and separated to some distance and connected by a platform or flooring upon which the engine and its boiler is mounted. Such skids form a sub-base for the support of the machinery, which sub-base may be moved about over the ground, functioning much as a sled.

Such engines are moved under their own power through the use of a cable and pulleys wherever needed about the ground where they are employed. It is, however, often desirable to move them from one location to another which will involve considerable distance. It is not very practical to do this by pulling themselves over the ground. For such conditions it is more practical to place the engines and their skids upon trucks and to move them by rail. It is for this and analogous purposes that the trucks which constitute this invention have been particularly designed.

The construction of the truck in its main features is immaterial, except that it must be made of heavy strong construction in order to be able to carry the load of the engine. This construction involves a heavy frame, as 1, which in the truck shown is built up of rolled steel shapes. This truck has two pairs of wheels, 2—2, which are journaled in the frame after the usual or any accepted type of construction.

Pivotally mounted upon this truck is a bunk or bolster 3. This is mounted to turn about a central king pin or bolt located at 30, or in any other equivalent manner secured so that it may freely turn about a vertical axis located at this point. The truck is provided with a circular wear plate or side bearing ring 4 which is located as near as is feasible to the outer side margins of the truck frame. The bunk is designed to engage these wear plates whenever they are unequally loaded, so as to depress one side slightly. Otherwise or if the loading is correctly balanced, and the track is level, the bunk may or may not have special wear plates secured thereto for engagement with the ring 4.

The construction of the skids upon which the logging engines are usually mounted is illustrated by the broken lines in Figure 2, wherein two logs 5 are indicated, these being separated so that when loaded upon the truck they rest upon the extreme outer sections of the bunk. The connecting platform or floor is indicated in location by the broken lines 50 and is at a considerable level above the bottom surface of the logs 5.

A bunk to carry such a load as a logging engine must be very strong, as these engines with their skid and everything carried thereby, frequently weigh thirty tons or more. The bunk 3 is therefore provided with a central post or strut 31 which extends upwardly and tie or tension rods 6 are extended over the strut and downward at an angle at each side towards the ends of the bunk. The outer ends of these are secured at the outer ends of the bunk.

As illustrated a plate 32 is secured to the outer ends of the bunk, this plate preferably having a flange 33 which projects somewhat under the ends of the bunk and engaging with its lower surface. The rods 6 pass through these plates and are provided with nuts 34 by which their tension can be adjusted.

In order to keep the tension rods 6 at such a level as to provide sufficient length of surface at the ends of the bunk for the reception of the logs 5 of the skid, the rods are given a bend, as shown at 60, and are held down below a straight line between the top of the strut and the plate 32, by means of a bracket or casting 61 which is secured to the bunk and through which the rods 60 pass.

In using these trucks for such a purpose as that stated, it is necessary to employ two trucks, one placed under each end of the skid. When so mounted the skid forms the draft connection between the two trucks and the separation may be such as to conform to the length of the skids.

It is evident from the construction described that the bunk may revolve through a complete circle about its pivot. This, under certain conditions, is a great advantage. The logging engines as mounted upon such skids have their engines placed thereon at one end of the skid and the boiler at the other. It is designed that the cables running from the drums of the engine shall extend outward in a definite direction.

It is often desirable to have the skid shifted so as to point in very different directions and it is often desirable to turn the engine around. Such shifting may be done by the use of a spur track such as is shown in Figure 4. In this view 7 may indicate the main track. From this a spur as 70 may be constructed. This may be done simply for the purpose of getting the engine into proper angular position or it may be a spur already constructed.

In order to shift the position of the engine it is only necessary to run one truck upon one of these lines and the other truck upon the other, thus producing a condition which in ordinary operation would be known as splitting a switch. The trucks are run from the point of junction of the two tracks as far as may be. They will then occupy a position corresponding to that indicated in Figure 4. In such position the truck that was ahead when the device was put in this position, is first brought back into the switch, the other following. This makes a convenient means for reversing the engine or for shifting it in any position with relation to the track. The engine may in some cases be operated while mounted upon the trucks in which case short sections of spur tracks would be constructed for this purpose.

I have found by actual test that the particular construction and manner of mounting of the bunks upon the trucks makes a bunk which is amply strong to stand the heavy weights of the service indicated, even over rough tracks, whereas any other type of bunk which has so far been tested will not stand up under this use. This type of bunk has its post 31 and the tension rod 6 projecting above the upper surface of the bunk and, while for some purposes this might be an objection, it is not an objection for the use for which it has been designed and it adds very greatly to the supporting power of the bunk.

What I claim as my invention is:

1. A truck having a circular side bearing plate, a bunk pivoted concentric with said bearing plate and having a trussed construction which is centrally increased in depth by extension upwardly from the level of its outer ends.

2. A truck bunk comprising a beam having an upwardly extending post at the center of its length and tension rods bearing upon the upper end of said post and having their ends secured to the ends of said beam, and passing below the upper surface of the bunk well inwardly from its ends to provide an unobstructed carrying surface at each end.

3. A car bunk comprising a beam, a strut extending upward centrally therefrom, tension rods passing over said strut and at each side of the beam towards its ends, and anchor plates extending across the ends of the beam to which the tension rods are anchored.

4. A car bunk comprising a beam, a strut extending upward centrally therefrom, tension rods passing over said strut and at each side of the beam towards its ends, anchor plates extending across the ends of the beam to which the tension rods are anchored, and deflecting clips carried by the bunk and engaging the tension rods inward from the ends of the beams, the tension rods being laterally bent to bring them at said clips down to the level of the top surface of the beam.

Signed at Seattle, King County, Washington, this 7th day of March 1921.

JOHN C. ROSS.